US012756722B2

(12) United States Patent
Kopp et al.

(10) Patent No.: US 12,756,722 B2
(45) Date of Patent: Oct. 6, 2026

(54) ALERT FUSION FOR EXTENDED DETECTION AND RESPONSE TO SECURITY ANOMALIES

(71) Applicant: Cisco Technology, Inc., San Jose, CA (US)

(72) Inventors: Martin Kopp, Komarov (CZ); Cenek Skarda, Praha Bechovice (CZ); Josef Krupicka, Mnisek pod Brdy (CZ); David Sislak, Prague (CZ); Michal Svoboda, Prague (CZ)

(73) Assignee: Cisco Technology, Inc., San Jose, CA (US)

( * ) Notice: Subject to any disclaimer, the term of this patent is extended or adjusted under 35 U.S.C. 154(b) by 173 days.

(21) Appl. No.: 18/231,816

(22) Filed: Aug. 9, 2023

(65) Prior Publication Data

US 2024/0356943 A1 Oct. 24, 2024

Related U.S. Application Data

(60) Provisional application No. 63/461,374, filed on Apr. 24, 2023.

(51) Int. Cl.
*H04L 9/40* (2022.01)
*H04L 41/16* (2022.01)

(52) U.S. Cl.
CPC .......... *H04L 63/1416* (2013.01); *H04L 41/16* (2013.01); *H04L 63/1425* (2013.01); (Continued)

(58) Field of Classification Search
CPC . H04L 63/1416; H04L 41/16; H04L 63/1425; H04L 63/20; H04L 63/1408; H04L 63/1433
See application file for complete search history.

(56) References Cited

U.S. PATENT DOCUMENTS 10,873,596 B1 12/2020 Bourget et al.
11,290,483 B1 3/2022 Kannan et al.
(Continued)

FOREIGN PATENT DOCUMENTS

WO WO2023090864 A1 5/2023

OTHER PUBLICATIONS

Search Report and Written Opinion for International Application No. PCT/US2024/024881, Dated Jul. 1, 2024, 15 pages.
(Continued)

*Primary Examiner* — Joe Chacko
(74) *Attorney, Agent, or Firm* — Lee & Hayes, P.C.

(57) ABSTRACT

Techniques described herein for extended detection and response to security anomalies in computing networks can perform automated analysis of anomalies occurring in different telemetry sources in a computer network, in order to synthesize the anomalies into analyst work units that are surfaced for further analysis by security response teams. Anomalies can initially be processed in order to identify and collect extended anomaly data. The extended anomaly data can then be used to group the anomalies according to a multi-stage grouping process which produces analyst work units. The analyst work units can be processed to produce analyst summaries that assist with analysis and response. Furthermore, the analyst work units can be prioritized for further analysis, and analyst interactions with the prioritized analyst work units can be used to influence subsequent anomaly grouping operations.

21 Claims, 9 Drawing Sheets

(52) U.S. Cl.
CPC .......... *H04L 63/20* (2013.01); *H04L 63/1408* (2013.01); *H04L 63/1433* (2013.01)

(56) References Cited

U.S. PATENT DOCUMENTS

| | | | | |
|---|---|---|---|---|
| 2015/0261963 | A1* | 9/2015 | Ukil | G06F 21/6245 726/26 |
| 2017/0243009 | A1 | 8/2017 | Sejpal et al. | |
| 2019/0362278 | A1 | 11/2019 | Saraf et al. | |
| 2020/0272741 | A1 | 8/2020 | Bhatia et al. | |
| 2022/0038490 | A1 | 2/2022 | Thakur et al. | |
| 2022/0070209 | A1 | 3/2022 | Lantuh et al. | |
| 2022/0103590 | A1 | 3/2022 | Steimberg et al. | |
| 2022/0210195 | A1 | 6/2022 | Parekh et al. | |
| 2022/0224721 | A1* | 7/2022 | Bertiger | H04L 41/0681 |
| 2022/0294817 | A1 | 9/2022 | Parekh et al. | |
| 2022/0329630 | A1 | 10/2022 | Li | |
| 2022/0337621 | A1 | 10/2022 | Peters et al. | |
| 2022/0345469 | A1 | 10/2022 | Domagalski et al. | |
| 2023/0009127 | A1 | 1/2023 | Boyer | |
| 2023/0018808 | A1 | 1/2023 | Silberman et al. | |
| 2023/0110056 | A1 | 4/2023 | Gullikson et al. | |
| 2023/0113375 | A1* | 4/2023 | Thomas | H04L 63/1441 726/23 |
| 2023/0135590 | A1 | 5/2023 | Pearcy et al. | |
| 2023/0146804 | A1 | 5/2023 | Narula et al. | |
| 2023/0401288 | A1 | 12/2023 | Dubin | |
| 2024/0137375 | A1 | 4/2024 | Srivatsa et al. | |
| 2024/0303530 | A1 | 9/2024 | Ru et al. | |
| 2024/0356934 | A1 | 10/2024 | Skarda et al. | |
| 2024/0356942 | A1 | 10/2024 | Kopp et al. | |
| 2025/0103713 | A1 | 3/2025 | Oba et al. | |

OTHER PUBLICATIONS

Search Report and Written Opinion for International Application No. PCT/US2024/024871, Dated Jul. 16, 2024, 15 pages.
Search Report and Written Opinion for International Application No. PCT/US2024/024887, Dated Jul. 3, 2024, 19 pages.
George, D. A. S., George, A. H., Baskar, T., & Pandey, D. (2021). XDR: The Evolution of Endpoint Security Solutions-Superior Extensibility and Analytics to Satisfy the Organizational Needs of the Future. International Journal of Advanced Research in Science, Communication and Technology (IJARSCT), 8(1), 493-501.
Svoboda, Michal "Security Detection with XDR" Jun. 13, 2022 Cisco pp. 1-18.

* cited by examiner

ALERT FUSION FOR EXTENDED DETECTION AND RESPONSE TO SECURITY ANOMALIES

CROSS REFERENCE TO RELATED APPLICATION

This application claims the benefit of U.S. Provisional Application No. 63/461,374 filed Apr. 24, 2023, and entitled "EVENT DESCRIPTIONS AND ALERTS FOR EXTENDED DETECTION AND RESPONSE (XDR) SYSTEMS," the contents of which are hereby incorporated herein by reference in their entirety.

TECHNICAL FIELD

The present disclosure relates generally to computer and network security, and to threat detection, analysis, and alerts in particular.

BACKGROUND

Security analytics products struggle with the trade-off between the number of alerts that can be generated and the capacity of security response teams to process them. The problem is most acute at larger enterprises with multiple security products which can generate thousands of alerts daily, thus overwhelming the security response team's capacity to act. Simple countermeasures like filtering or suppressing alerts based on existing policies or customer feedback do not solve the problem well, as they may lead to missed important alerts and elevated security risks. A more universal solution is needed to surface relevant security alerts without overwhelming the security response teams.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
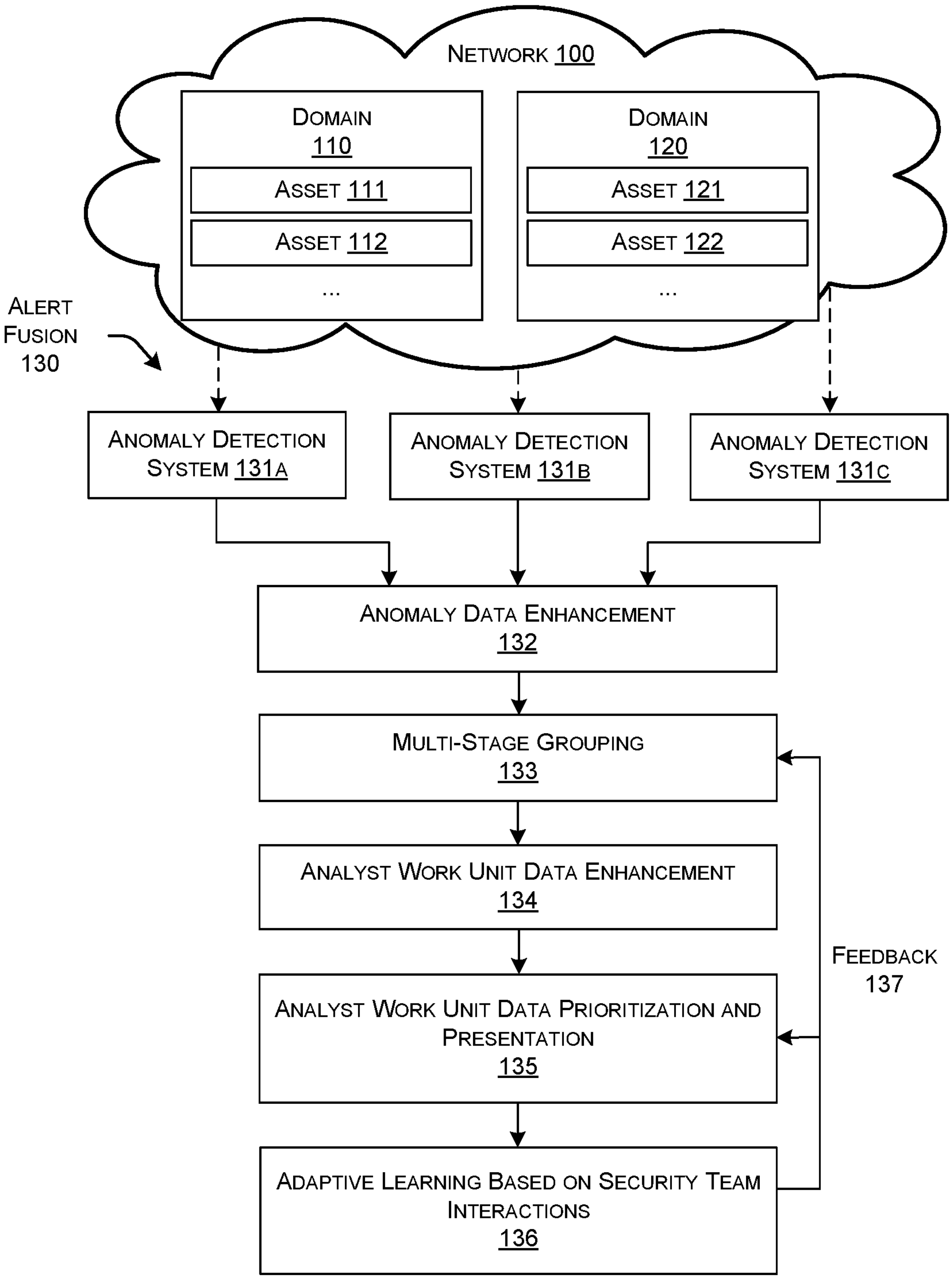
FIG. 1 illustrates an example overview of techniques according to this disclosure, including anomaly detection in a network, anomaly data enhancement, multi-stage grouping to generate analyst work units, analyst work unit data enhancement, analyst work unit data prioritization and presentation, and security team interactions with the analyst work units, in accordance with various aspects of the technologies disclosed herein.

This disclosure describes techniques that can be performed in connection with extended detection and response to security anomalies in computing networks. Any one of the disclosed techniques, or any group of the disclosed techniques, can optionally be implemented via computing devices that provide automated processing of security-related events in a computing network, such as a network owned by a company, university, or government agency. In general, processing of security-related events can result in information that is presented to a security response team, e.g., a team of human analysts, for further analysis and resolution.

According to example embodiments, one or more methods can be performed by a computing device, e.g., a server device coupled to a network. The network can comprise, e.g., multiple different domains and multiple different computing assets. The different computing assets may be associated with different asset criticality values.

Example methods can optionally include detecting anomalies in the network. Alternatively, anomalies can be detected using third-party anomaly detection systems. Different anomalies may be detected with different confidence values. Anomaly detection can optionally be performed by multiple different anomaly detection systems that may be dedicated to different network domains, geographical zones, or computing asset types.

Detected anomaly data can be enhanced using the anomaly data enhancement techniques described herein. Anomaly data enhancement can include receiving security event information comprising at least one attribute associated with an anomaly detected in a network. The security event information can be provided as an input to a neural network-based processor. The neural network-based processor can identify at least one representative attribute based on the input.

The representative attribute can be determined by the neural network-based processor to represent the anomaly for security analyses of instances of the anomaly. A template comprising the representative attribute may be generated, and the template can be deployed to a production environment. The production environment can be configured to automatically detect the instances of the anomaly in the network, and the production environment can be configured to use the template to define at least one collected attribute that is collected for the security analyses of the instances of the anomaly.

The anomalies, optionally represented by enhanced anomaly data, can be grouped according to a multi-stage grouping process to generate analyst work units. In an example first stage of the multi-stage grouping process, anomalies can be analyzed, based on threat intelligence information, in order to group the anomalies into multiple different threat occurrence groups. Each threat occurrence group can therefore comprise one or more of the anomalies.

In an example second stage of the multi-stage grouping process, the multiple different threat occurrence groups can be grouped into multiple different analyst work units. Therefore, each analyst work unit can comprise one or more of the threat occurrence groups.

The analyst work units can optionally be enhanced by analyst work unit data enhancement techniques described herein. Methods to enhance analyst work units can include receiving an analyst work unit, the analyst work unit comprising one or more threat occurrence groups, and each of the one or more threat occurrence groups comprising one or more detected anomalies detected in a network comprising multiple different computing assets. The methods can furthermore comprise identifying, within a data store comprising computing threat information, at least one similar threat that has higher similarity to the analyst work unit than one or more other threats identified in the data store. Identifying the at least one similar threat can comprise, e.g., performing a nearest neighbor search on the data store. Finally, the methods can include generating an analyst summary of the analyst work unit. Generating the analyst summary can comprise, e.g., using a neural network-based generator to process the analyst work unit and the at least one similar threat.

The multiple different analyst work units, optionally enhanced according to the techniques described herein, can be prioritized. For example, the multiple different analyst work units can be prioritized based on respective asset criticality values of respective computing assets affected by respective anomalies included in respective analyst work units. The multiple different analyst work units can furthermore be prioritized based on respective confidence values of respective anomalies included in respective analyst work units.

A prioritized display of the multiple different analyst work units can be provided, e.g., for analyst review. One or more analyst interactions can be received via the prioritized display of the multiple different analyst work units, resulting in analyst interaction data. Embodiments can store the analyst interaction data for use in subsequent grouping operations to facilitate grouping subsequent threat occurrence groups into subsequent analyst work units.

The techniques described herein may be performed by one or more computing devices comprising one or more processors and one or more computer-readable media storing computer-executable instructions that, when executed by the one or more processors, cause the one or more processors to perform the methods disclosed herein. The techniques described herein may also be accomplished using non-transitory computer-readable media storing computer-executable instructions that, when executed by one or more processors, perform the methods carried out by the network controller device.

Example Embodiments

One problem in modem cybersecurity is alert fatigue. Even senior analysts are often overwhelmed by the number of alerts and incidents they must handle. The situation is even worse in cross-product scenarios. A single human analyst cannot possibility know and understand a large number of different signals from many different security products and telemetry sources.

Embodiments of this disclosure can address alert fatigue while also increasing the efficiency and effectiveness of analysts tasked with analyzing and responding to security events in a network. A group of complimentary systems and techniques is disclosed. In some embodiments, the disclosed techniques can optionally be applied together to provide analysts with high-quality, synthesized information that allows them to quickly understand, research, and act in response to security threats from multiple different telemetry sources. Alternatively, any one of the disclosed techniques, or any sub-group of the disclosed techniques, can optionally be provided in a freestanding approach that need not necessarily also include other techniques disclosed herein.

The techniques according to this disclosure fall into three categories: First, given anomalies detected in a network, optionally via multiple different telemetry sources, techniques disclosed herein can include anomaly data enhancement configured to discover representative attributes of the anomalies. The representative attributes can include attributes determined to be useful in anomaly analysis and resolution.

Second, multi-stage grouping and prioritization methods can be performed to generate analyst work units that can be presented to analysts in a prioritized manner, such as a list of analyst work units arranged in descending priority. Active learning can be applied to security team interactions with the analyst work units in order to adjust and customize the multi-stage grouping and prioritization methods over time.

Third, techniques disclosed herein can include analyst work unit data enhancement which can generate analyst summaries of analyst work units. The analyst summaries can support faster analysis and response times to threats associated with the analyst work units.

With regard to the anomaly data enhancement techniques disclosed herein, In the domain of cybersecurity, extended detection and response (XDR) and cross-domain detection systems collect and process security-related anomalies from various types of products, such as intrusion detection systems (IDS) and intrusion prevention systems (IPS). XDR as applied herein can thus collect and process security-related anomalies from more than one type of telemetry source, thereby extending endpoint by considering, e.g., network and email and/or other telemetry sources/modalities. Collected security events can be combined into a unified feed, providing analysts with a comprehensive overview of anomalies in the monitored environment, e.g., in the network.

However, due to differences in format, level of detail, and naming conventions used by different security products and in connection with different telemetry sources, cybersecurity analysts face significant challenges in efficiently understanding the generated anomalies. This issue persists even in ideal setups, where the cross-domain product effectively filters and presents only the most critical events.

Current security engines can produce hundreds to thousands of unique security event types, each with a large number of unique attributes. When investigating anomalies, analysts must read the relevant event descriptions and search for the subset of attributes that serve as convicting evidence. This highly time-consuming process requires a high level of expertise and becomes unmanageable as more engines and their unique event types are integrated into a cross-domain system. Consequently, there is a need to streamline the information presented to analysts, prioritize the most relevant event details, and facilitate a more efficient investigation process.

Example anomaly data enhancement techniques disclosed herein can utilize a neural network-based processor, such as a natural language processor (NLP) or a large language model (LLM). Example network-based processors include the generative pre-training transformer, version three (GPT3), the generative pre-training transformer, version four (GPT4), and others.

In general, example anomaly data enhancement techniques can process security events/anomalies independently. The neural network-based processor can process a security event and its description and can incorporate one or more representative attributes into an event description. The result can be encoded into a generated template with the representative attributes selected by the neural network-based processor.

To preserve consistency and minimize the risk of incorrect suggestions, example anomaly data enhancement techniques can repeat operations across multiple event/anomaly samples. Resulting templates and chosen representative attributes can be compared. If the templates and representative attributes satisfy a predefined consistency check, then a selected consistent template and its representative attributes can be associated with the security event/anomaly. The selected template and representative attributes can be deployed into a production environment.

In some embodiments, a new template can be generated each time a new event type/anomaly is introduced. Since the underlying cybersecurity engines may change over time, repetitive consistency checks can be performed. There are two different ways that events/anomalies produced by cybersecurity engines may change: first, the structure or the schema of an event's attributes may be upgraded, e.g., by adding new attributes or deprecating previously available attributes. Second, the engines that produce the event may change either by external factors that influence the statistical properties of events (e.g. by emergence of new malware strains) or by internal changes in the engines such as may be caused by bug fixes, parameter tuning or other kinds of maintenance.

Example methods can be adapted to detect these changes, followed by the regeneration of templates. Embodiments can be configured to detect changes in any of several ways. First, a change of event/anomaly attribute schemas may be incompatible with previously generated templates, e.g., if an attribute has been renamed. These changes may be detected by storing historical versions of schemas and comparing them to new event/anomaly schemas. Second, internal engine changes may be detected by periodic regeneration of templates and comparing them to previous versions. If a previous template is sufficiently different from an updated template, then a revision of the template can be prompted.

The disclosed anomaly data enhancement techniques need not require event attribute normalization, i.e., an event schema need not have to adhere to a predefined structure. Furthermore, the disclosed anomaly data enhancement techniques can leverage common cyber security domain knowledge in order to generate event summaries. The disclosed anomaly data enhancement techniques can generate templates in a natural language, as opposed to a structured list of attributes.

With regard to the multi-stage grouping and prioritization disclosed herein, further techniques according to this disclosure can comprise multi-stage grouping of anomalies from different security products and telemetry sources, as well as prioritization and presentation of resulting groups to the analyst. Example techniques can employ Artificial Intelligence (AI) and active learning to synthesize an actionable list of "analyst work units" for the security response teams of enterprises regardless of their size or complexity of their information technology infrastructure.

Multi-stage grouping and prioritization methods can take into account available threat intelligence to measure the potential damage caused by a given threat, together with the confidence of the underlying detection engine. For example, multi-stage grouping and prioritization methods can consider a network's asset inventory information and can measure the relative business value of assets in the network environment, the roles of different asset types (e.g., servers, laptops, phones, medical devices, etc.), and the potential impact of asset compromise.

Optionally, multi-stage grouping and prioritization methods can consider additional aspects like geography, threat type, or remedy action type for smart grouping. Considering a set of selectable dimensions (e.g., threat severity, threat occurrence confidence, asset value), the multi-stage grouping and prioritization methods can proceed with clustering detected anomalies in a multi-dimensional space, thereby generating fused analyst work units. Such clustering can optionally reduce the number of alerts by 90% or more, and techniques can optionally be configurable to target a desired degree of alert reduction specified by an analyst or security response team.

An analyst work unit generated according to the disclosed multi-stage grouping and prioritization methods can represent an intuitive unit of work for the security analyst to investigate and remediate. Analyst work units can optionally be presented to analysts as a single prioritized list, which can be prioritized according to analyst-selected dimensions, and which can present analyst work units in, e.g., descending order according to their associated priority, so that the analyst or security response team can conduct timely and adequate incident responses.

Furthermore, security analysts can provide feedback for analyst work units, which can be used in an active learning loop. Based on the analysts' feedback, the multi-stage grouping and prioritization methods disclosed herein can adapt to accommodate, e.g., network-specific sensitivity to particular threats, or to the relative values of different assets. Multi-stage grouping and prioritization methods can thereby adapt to track a set of evolving network security policies expressing the acceptable security risk levels of a particular network. The analyst feedback can be applied to customize both multi-stage grouping as well as prioritization, so that over time anomalies can be grouped in more granular or less granular groupings, and resulting analyst work units can be prioritized differently, based on analyst feedback and preferences.

Security policies capturing learned rules can optionally be inferred automatically. Furthermore, in some embodiments, adaptive learning can allow multi-stage grouping and prioritization methods to learn default settings for various industries, so that new customers can be provided with industry-specific security settings that may require a lower degree of analyst feedback and adjustments.

Example multi-stage grouping and prioritization methods can use any of a variety of different variables to group anomalies. Furthermore, any of the variety of different variables can be used to prioritize analyst work units. Example variables that can be used for grouping and/or prioritization include, without limitation, threat severity, confidence of threat detection, threat type, asset value, remedy action type, and geographic location. In some embodiments, grouping based on one or more of the variables can be mandatory, while grouping based on one or more other variables can be optional. For example, some embodiments, grouping based on threat severity and confidence of threat detection can be mandatory, while grouping based on threat type, asset value, remedy action type, and geographic location can be optional. Optional variables used for grouping can be, e.g., selected and deselected by a security team. Furthermore, in some embodiments, optional fields such as asset value, geography or even remedy action type can be inferred from the provided mandatory fields if not directly provided.

Any desired grouping methods can be used for the different stages of a multi-stage grouping process. Example grouping methods include any unsupervised clustering or community selection method known in the art or as may be developed. Example clustering methods include, e.g., modularity clustering methods and/or spectral clustering methods. Further example grouping methods can be based on existing industry standard definitions, when available, such as by using MITRE types for grouping based on threat severity, using predefined external data sources such as StealthWatch Host Groups for grouping by threat type, and/or using asset management process (AMP) groups to imply asset values, in order to group by asset value.

In order to capture and use analyst interaction data for modification of the multi-stage grouping process, user feedback embedding processes can be deployed to capture user changes in groupings output by the multi-stage grouping process. Analyst interaction data can be utilized for future grouping operations. In some embodiments, grouping based on analyst interaction data can override external definitions and can influence results of future clustering runs. In some embodiments, reinforcement learning from human feedback (RLHF) technology can be applied to capture and use analyst interaction data for modification of the multi-stage grouping process.

Multi-stage grouping and prioritization processes can be adapted to minimize analyst incident response efforts by adaptive prioritization, adaptive grouping, explanation, and prioritization of generated analyst work units depending on, e.g., a type of threat, a number of affected network assets, a current state of a network, and/or known or estimated asset values of affected assets. Multi-stage grouping and prioritization processes can thereby reduce "alert fatigue" without sacrificing anomaly information and response effectiveness. Any number of detected anomalies can be condensed and prioritized into analyst work units representing meaningful threats without overwhelming a security response team's incident response capacity.

With regard to the analyst work unit data enhancement disclosed herein, further techniques according to this disclosure can apply analyst work unit data enhancement techniques to generate analyst summaries based on analyst work units, e.g., based on the analyst work units that are output from a multi-stage grouping process such as described above. Example processes can use analyst work units as inputs and can generate textual summaries of the analyst work units, assess risks associated with the analyst work units, and propose analyst response actions for responding to the analyst work units. The analyst work unit data enhancement techniques can assist analysts to determine a proper risk/priority of an analyst work unit and suggest the next steps, thereby speeding up analyst response times.

Analyst work unit data enhancement techniques according to this disclosure can be adapted to use a threat intelligence data store, which can be internal, e.g., owned and operated internally by a company or other organization, or external, e.g., owned and operated by a third party. When an internal threat intelligence data store is used, for example, generating analyst summaries of the analyst work unit can be performed by a server coupled to a local area network, and wherein the local area network can further comprise, or be coupled to, the internal threat intelligence data store. When an external threat intelligence data store is used, generating analyst summaries of the analyst work unit can be performed by the server coupled to a local area network, however, the server may connect to an external network (other than the local area network) which comprises the external threat intelligence data store. Example threat intelligence data stores are the TALOS and MITRE threat intelligence data stores, which include threat/malware taxonomies and optionally further include response playbooks for responding to threats.

Analyst work unit data enhancement techniques can be configured to use an analyst work unit, or one or more associated anomalies, as an input, and can perform a nearest neighbor search of the threat intelligence data store to find similar known threat/malware families, e.g., finding a most similar known threat/malware family. Similarity can be according to any desired comparison information, e.g., threat assessment information, security event/anomaly information, etc.

After identifying one or more similar known threats, analyst work unit data enhancement techniques herein can be configured to generate inputs for a neural network-based processor, e.g., an attention-based or other NLP or LLM neural network, to thereby instruct the neural network-based processor to create an analyst summary of the input analyst work unit based on threat intelligence information associated with the one or more similar known threats. The analyst summary can include, inter alia, a measurement of potential risk of the input analyst work unit based on the one or more similar known threats. The analyst summary can furthermore include suggested next actions according to existing playbooks or records of former investigations performed in connection with the one or more similar known threats.

Example analyst summaries output by analyst work unit data enhancement techniques herein can include a high-level overview of the threat posed by the analyst work unit. For example, "This alert resembles a malware dropper. After infecting a device such malware downloads and installs additional modules. Potential risk ranges from malicious advertisement to exfiltration and/or data destruction. We suggest . . . " Another example high-level overview may comprise, "This alert resembles a new strain of qakbot. Qakbot is known for . . . " Another example high-level overview may comprise, "According to the techniques used, the alert resembles the work of the known advanced persistent threat (APT) group [insert group name]. Based on their previous breaches, we suggest . . . "

In some embodiments, analyst work unit data enhancement techniques herein can leverage the capabilities of LLMs such as large language model meta-AI (LLaMA), GPT-4, and successors to simplify analyst summary generation. An LLM based processor can use existing threat intelligence to fine-tune information associated with a similar threat. The LLM based processor can furthermore use the similar threat to create the analyst summary of a given analyst work unit as well as suggested response actions. The LLM based processor can furthermore assess the potential risk associated with an analyst work unit based on similar threat, e.g., based on similar malware families and/or known breaches.

In an example, an input generator that is adapted to generate an input for an LLM based processor may generate the following natural language prompt:

Here are some data from a security alert. Compose a concise story of what happened, as if it were a security risk report:

Risk: High

Event 1 title: Tor

Event 1 text: You are sending traffic to the Tor network

Event 2 title: Disabling security tools

Event 2 data "commandLineArguments": "sudo spctl-master-disable"

In response to the above example input, the LLM based processor may generate the following example analyst summary output:

Title:

High-Risk Security Incident Involving Tor Network and Disabling of Security Tools Summary:

A high-risk security incident was detected on the network, involving the use of Tor for anonymizing traffic and a command to disable security tools. Immediate action is required to mitigate the potential threat.

Details:

1. Tor Network Utilization: The security system detected traffic being sent to the Tor network, which is known for providing anonymity to users. The use of Tor may indicate attempts to hide malicious activities or exfiltrate sensitive data from the organization.
2. Disabling Security Tools: A command was executed on the system to disable security tools, which is a potential indicator of compromise. The specific command executed was "sudo spctl-master-disable." This command disables the System Policy Control, which weakens the system's protection against unauthorized applications and potentially malicious software.

Recommendations:

1. Immediately investigate the source of the Tor network traffic and disable it if unauthorized or malicious activity is confirmed.
2. Identify and isolate the system(s) where the security tools have been disabled and restore the System Policy Control using the command "sudo spctl-master-enable."
3. Conduct a thorough review of the affected systems for any signs of compromise or data exfiltration.
4. Enhance network security monitoring to detect similar incidents in the future and consider implementing security awareness training for employees to prevent unauthorized activities.

Analyst work unit data enhancement techniques herein can be adapted to automatically generate analyst summaries, which can significantly simplify the investigation process, lower the required expertise of the cybersecurity analyst, and reduce time to react. To deliver consistent and trusted results without a possible exploit surface, the neural network-based processor can be employed within a controlled environment, e.g., a secure server that does not have a connection to public networks. Analyst work unit data enhancement techniques herein can solve a problem of evolving underlying security products, because the techniques will organically update along with updates to threat intelligence data stores and neural network-based processors such as LLM and NLP based models.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates an example overview of techniques according to this disclosure, including anomaly detection in a network, anomaly data enhancement, multi-stage grouping to generate analyst work units, analyst work unit data enhancement, analyst work unit data prioritization and presentation, and adaptive learning based on security team interactions with the analyst work units, in accordance with various aspects of the technologies disclosed herein.

FIG. 1 includes an example network 100 which can be monitored by various anomaly detection systems 131A, 131B, 131C. The network 100 can comprise multiple different domains 110, 120, and multiple different computing assets. For example, the domain 110 can comprise assets 111 and 112, and the domain 120 can comprise assets 121 and 122.

The illustrated number of domains and assets are examples only and it will be appreciated that typical networks may have many different domains and thousands of different computing assets. Example domains can include, e.g., a file system/storage domain, an email system domain, a security system/firewall domain, and various network/network equipment domains. Example assets can include, e.g., servers, laptops, user equipment (UEs), routers, firewalls, internet of things (IoT) devices, etc.

Different computing assets can have different asset criticality values. For example, an asset criticality of a server that stores or processes a large volume of sensitive company data may be much higher that an asset criticality of an employee UE, such as a smartphone, that stores mainly the employee's personal information. Furthermore, different computing assets can be located at different geographic locations. For example, the network 100 can computing assets in multiple different cities, regions, or countries.

The anomaly detection systems 131A, 131B, 131C can comprise, e.g., security monitoring systems that are configured to detect threats, security events, and other anomalies via various different telemetry sources, e.g., via at least two different telemetry sources, within the network 100. A wide variety of different anomaly detection systems are commercially available, and owners of advanced networks such as the network 100 may employ multiple anomaly detection systems 131A, 131B, 131C to alert their security response teams to potential threats to their network 100. The anomaly detection systems 131A, 131B, 131C can output anomaly data, e.g., alerts for further investigation by a security response team.

Anomalies output from the anomaly detection systems 131A, 131B, 131C can be processed according to the techniques described herein, referred to generally as alert fusion 130. FIG. 1 illustrates different processing techniques that can be applied, namely, anomaly data enhancement 132, multi-stage grouping 133 to generate analyst work units, analyst work unit data enhancement 134, analyst work unit data prioritization and presentation 135, and adaptive learning based on security team interactions 136 with the analyst work units.

In an embodiment, the adaptive learning based on security team interactions 136 can be configured to provide feedback 137 to multi-stage grouping 133 and/or to analyst work unit prioritization and presentation 135, in order to adaptively update the multi-stage grouping 133 and/or the analyst work unit prioritization and presentation 135. Furthermore, in some embodiments, the multi-stage grouping 133 and/or the analyst work unit prioritization and presentation 135 can be directly modified by analyst/security team inputs and selections.

Figure 2:
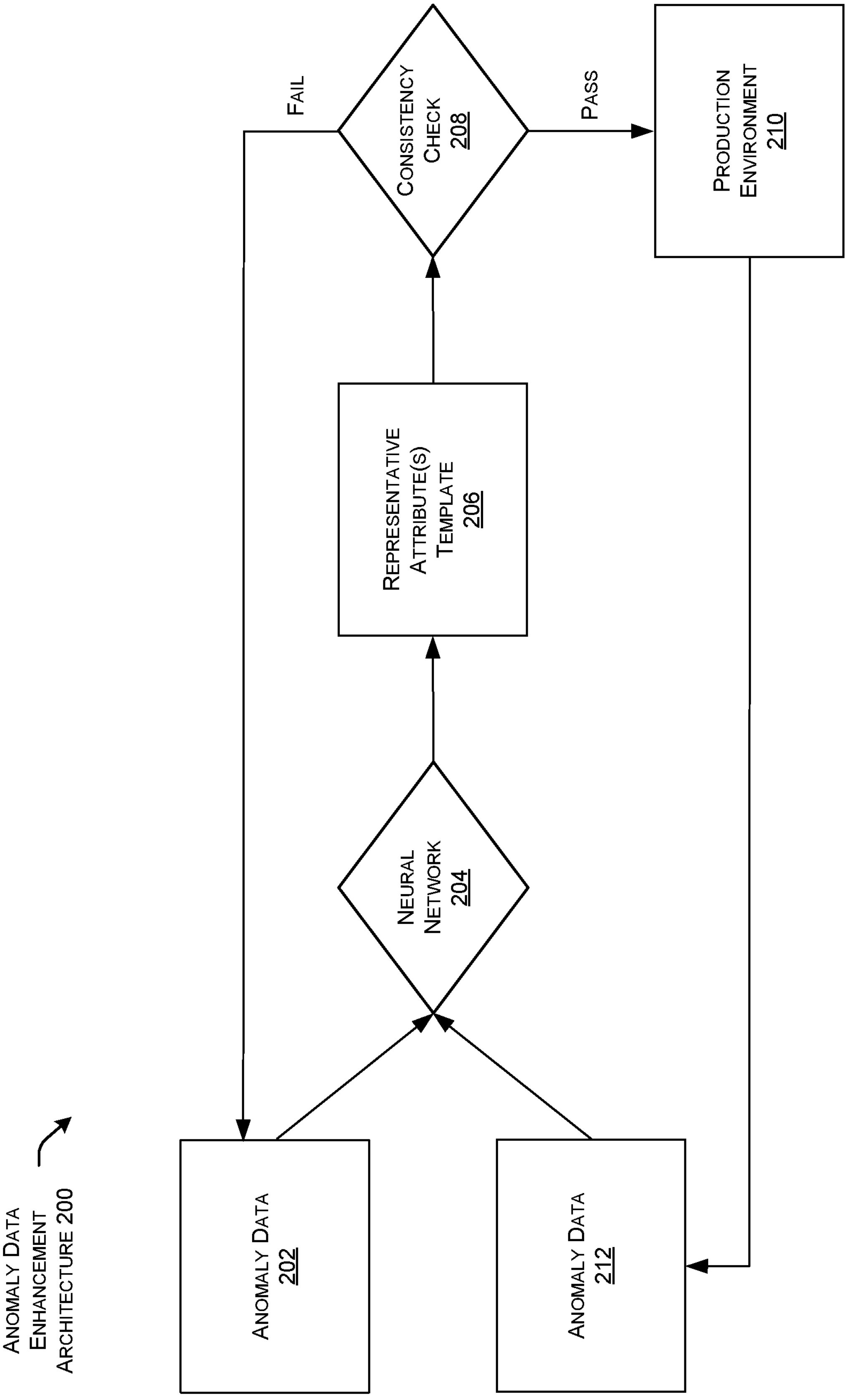
FIG. 2 illustrates example anomaly data enhancement, in accordance with various aspects of the technologies disclosed herein.
Figure 3:
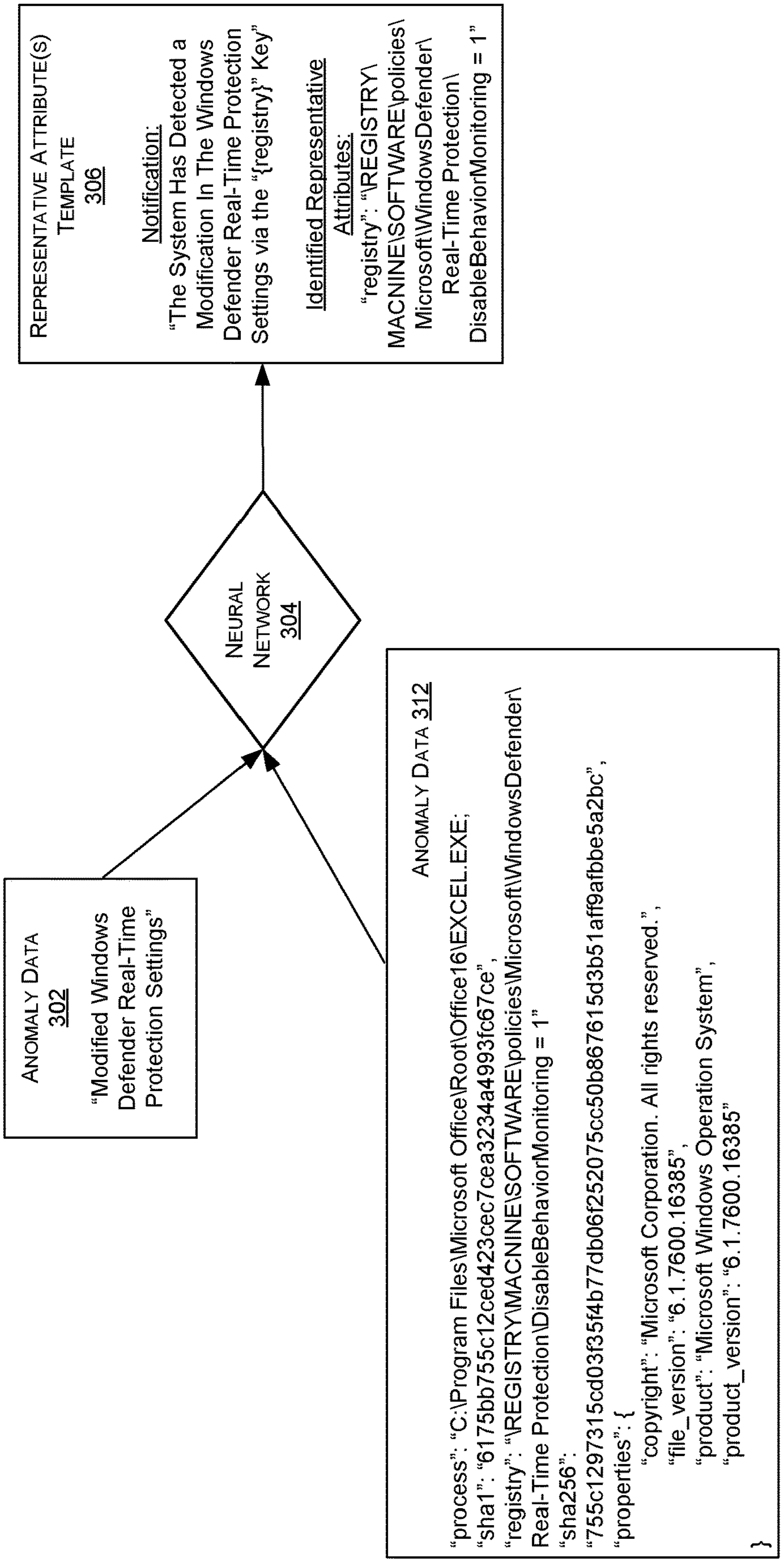
FIG. 3 illustrates a detailed example of the anomaly data enhancement introduced in FIG. 2, in accordance with various aspects of the technologies disclosed herein.
Figure 7:
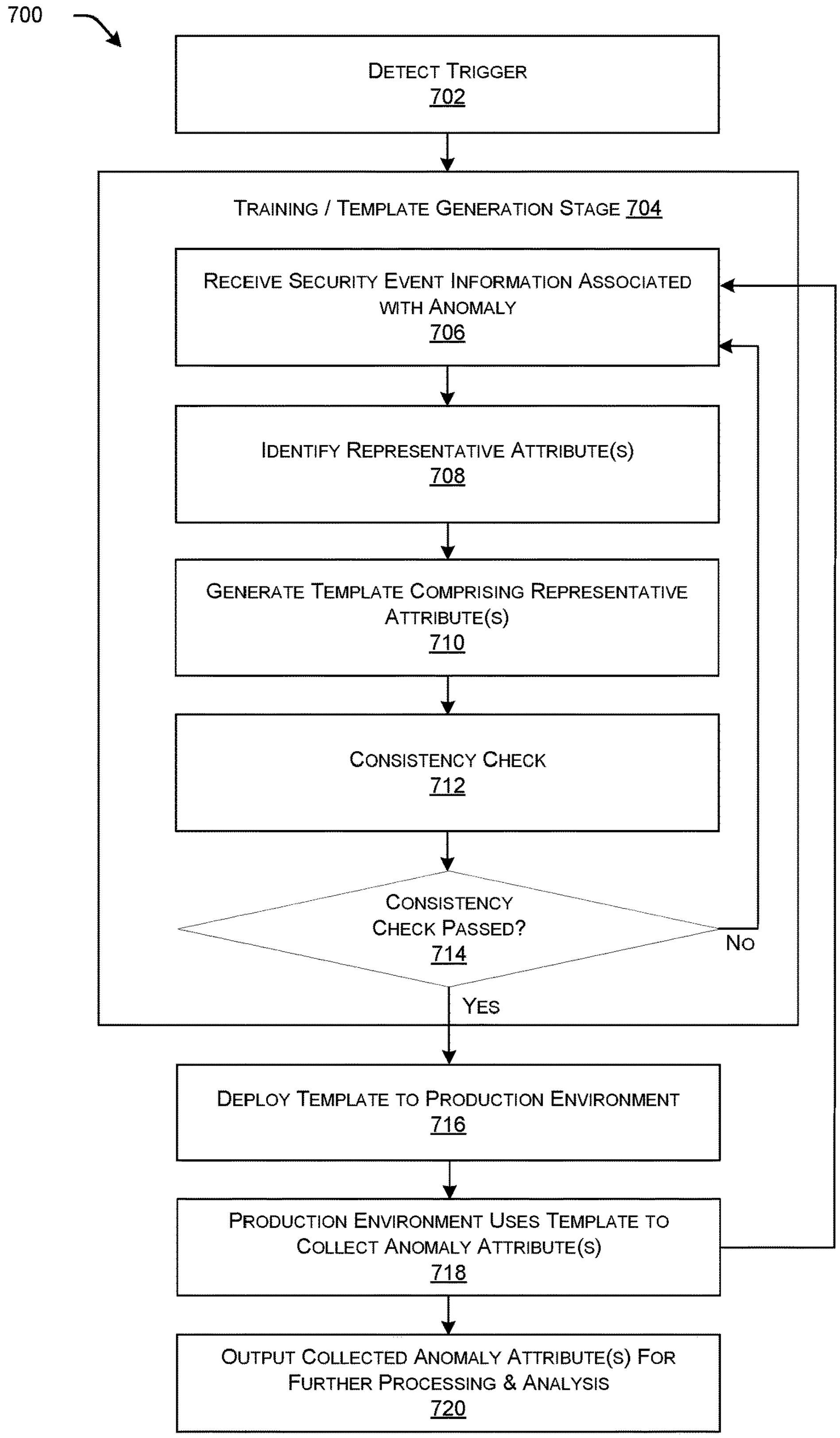
FIG. 7 is a flow diagram that illustrates an example method performed by a computing device in connection with anomaly data enhancement, in accordance with various aspects of the technologies disclosed herein.

Anomaly data enhancement 132 is described further in connection with FIG. 2 and FIG. 3, as well as the flowchart provided in FIG. 7. Multi-stage grouping 133 to generate analyst work units, analyst work unit data prioritization and presentation 135, and adaptive learning based on security team interactions 136 are described further in connection with FIG. 4, as well as the flowchart provided in FIG. 8. Analyst work unit data enhancement 134 is described further in connection with FIG. 5, as well as the flowchart provided in FIG. 9.

Figure 6:
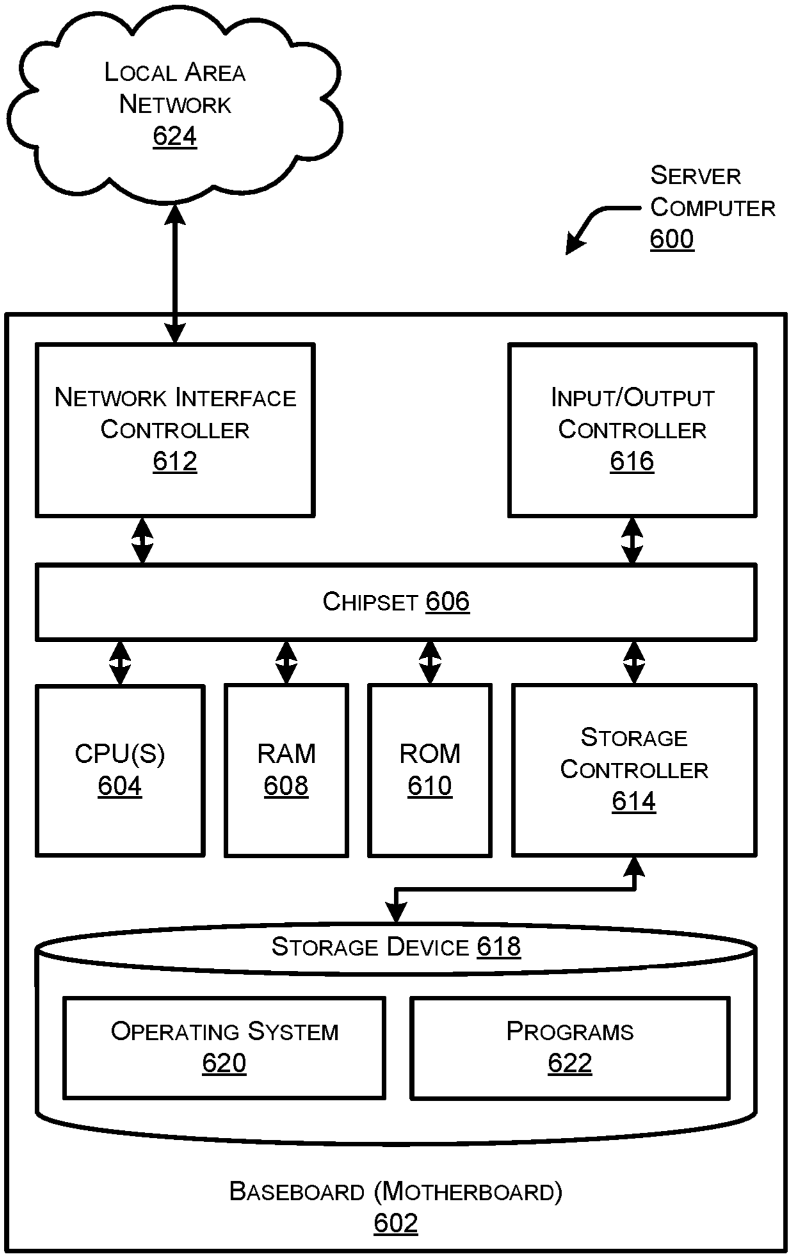
FIG. 6 illustrates an example computer hardware architecture that can implement the techniques disclosed herein, in accordance with various aspects of the technologies disclosed herein.

An example server that can be configured to perform any of the functions illustrated in FIG. 1 is illustrated in FIG. 6. Such a server can optionally be included within the network 100, and anomaly data enhancement 132, multi-stage grouping 133 to generate analyst work units, analyst work unit data enhancement 134, analyst work unit data prioritization and presentation 135, and adaptive learning based on security team interactions 136 can likewise be performed within the network 100.

FIG. 2 illustrates example anomaly data enhancement, in accordance with various aspects of the technologies disclosed herein. The illustrated anomaly data enhancement architecture 200 can be used to implement the anomaly data enhancement 132 introduced in FIG. 1 in some embodiments. The anomaly data enhancement architecture 200 includes anomaly data 202, neural network 204, representative attribute(s) template 206, consistency check 208, and production environment 210, and anomaly data 212.

In an example according to FIG. 2, a training/template generation stage can be initiated by, e.g., detecting anew anomaly type, or a change in a schema of an existing anomaly type. During the training/template generation stage, the anomaly data 202 can be provided as an input to the neural network 204, and the neural network can generate the representative attribute(s) template 206 based on the anomaly data 202. The anomaly data 202 can represent an anomaly having an anomaly type and output by an anomaly detection system 131A. The representative attribute(s) template 206 can comprise attributes determined by the neural network 204 to be useful for analyzing and resolving the anomaly represented by the anomaly data 202, based on threat intelligence information and/or prior anomaly investigations of similar anomalies.

The template generation process can be repeated according to multiple repetition cycles at the training/template generation stage, using different first instances of the anomaly data 202 as inputs to the neural network 204, and resulting in multiple instances of the representative attribute(s) template 206.

The multiple instances of the representative attribute(s) template 206 can then be compared at consistency check 208. The consistency check 208 can check whether the multiple instances of the representative attribute(s) template 206 satisfy a consistency threshold. For example, using a consistency threshold of 75%, the consistency check 208 can determine whether the multiple instances of the representative attribute(s) template 206 are at least 75% consistent. Any consistency threshold can be used. According to some examples, consistency thresholds can be between 70% and 99%.

If the consistency check 208 is failed, then the training/template generation stage can continue, optionally re-using one or more instances of anomaly data 202, and the repeating cycles can result in training the neural network 204, thereby increasing the consistency of the multiple instances of the representative attribute(s) template 206. Additional consistency checks can be performed on resulting instances of the representative attribute(s) template 206, and template generation can be repeated until the consistency check 208 is passed.

In response to the consistency check 208 being passed, a consistent template from among the instances of the representative attribute(s) template 206 can be provided to the production environment 210. The production environment 210 can comprise, e.g., a security system that monitors a network 100 in order to gather information regarding anomalies detected by anomaly detection systems such as 131A, 131B and 131C.

In response to receiving a representative attribute(s) template 206, the production environment 210 can begin using the representative attribute(s) template 206 to collect the representative attribute(s) designated by the representative attribute(s) template 206. For example, for each further/second instance within the network 100 of the anomaly associated with the representative attribute(s) template 206, the production environment 210 can collect the representative attribute(s) designated by the representative attribute(s) template 206. The production environment 210 can store or output the resulting anomaly data 212 for use by multiple systems, e.g., for further training of the neural network 204 and/or for further processing by multi-stage grouping 133, as described herein.

The anomaly data 212 can be provided to the neural network 204 for further training of the neural network 204. For example, the production environment 210 can output the anomaly data 212, and the neural network 204 can process the anomaly data 212, in order to further increase consistency of subsequent training/template generation stages.

FIG. 3 illustrates a detailed example of the anomaly data enhancement introduced in FIG. 2, in accordance with various aspects of the technologies disclosed herein. In FIG. 3, example anomaly data 302 represents an instance of the anomaly data 202 introduced in FIG. 2, example neural network 304 represents an instance of the neural network 204 introduced in FIG. 2, example representative attribute(s) template 306 represents an instance of the representative attribute(s) template 206 introduced in FIG. 2, and example anomaly data 312 represents an instance of the anomaly data 212 introduced in FIG. 2.

In FIG. 3, the anomaly data 302 comprises the detected security event, "Modified Windows Defender Real-Time Protection Settings." Furthermore, anomaly data 312 that is or has been used to train the neural network 304 includes:

"process": "C:\Program Files\Microsoft Office\Root\Office16\EXCEL.EXE;
"sha1": "6175bb755c12ced423cec7cea3234a4993fc67ce",
"registry":
"\REGISTRY\MACNINE\SOFTWARE\policies\Microsoft\WindowsDefender\Real-Time Protection\DisableBehaviorMonitoring = 1"
"sha256":
"755c1297315cd03f35f4b77db06f252075cc50b867615d3b51aff9afbbe5a2bc",
"properties": {
  "copyright": "Microsoft Corporation. All rights reserved.",
  "file_version": "6.1.7600.16385",
  "product": "Microsoft Windows Operation System",
  "product_version": "6.1.7600.16385"

The neural network 304 can generate the representative attribute(s) template 306 based on the anomaly data 302 and the anomaly data 312. The neural network 304 can select representative attributes from the anomaly data 302 and the anomaly data 312 to include in the representative attribute(s) template 306. In the illustrated example, the neural network 304 has identified the registry information from anomaly data 312 as a representative attribute for analyzing and resolving the anomaly associated with anomaly data 302. The neural network 304 has configured the representative attribute(s) template 306 to include a notification, "The System Has Detected a Modification In The Windows Defender Real-Time Protection Settings via the "{registry}" Key." The neural network 304 has configured the representative attribute(s) template 306 to furthermore include the identified representative attributes, "registry": "\REGISTRY\MACNINE\SOFTWARE\policies\Microsoft\WindowsDefender Real-Time Protection\DisableBehaviorMonitoring=1".

Figure 4:
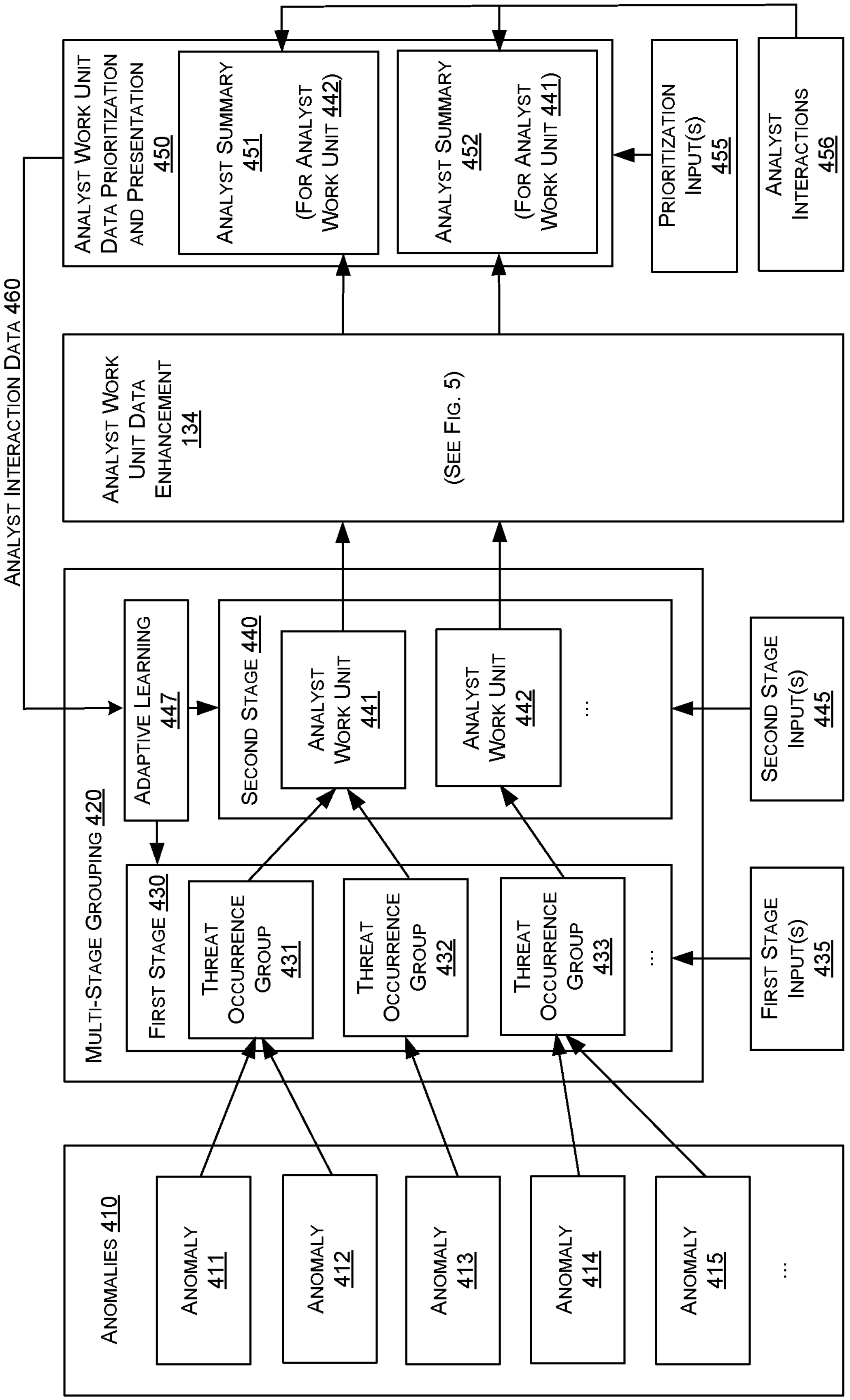
FIG. 4 illustrates example multi-stage grouping to generate analyst work units, analyst work unit data enhancement, analyst work unit data prioritization and presentation, and security team interactions with the analyst work units, in accordance with various aspects of the technologies disclosed herein.

FIG. 4 illustrates example multi-stage grouping to generate analyst work units, analyst work unit data enhancement, analyst work unit data prioritization and presentation, and security team interactions with the analyst work units, in accordance with various aspects of the technologies disclosed herein. FIG. 4 includes anomalies 410, multi-stage grouping 420, first stage input(s) 435, second stage input(s) 445, analyst work unit data enhancement 134, analyst work unit data prioritization and presentation 450, prioritization inputs 455, and analyst FIG. 4 illustrates example multi-stage grouping to generate analyst work units, analyst work unit data enhancement, analyst work unit data prioritization and presentation, and security team interactions with the analyst work units, in accordance with various aspects of the technologies disclosed herein. FIG. 4 includes anomalies 410, multi-stage grouping 420, first stage input(s) 435, second stage input(s) 445, analyst work unit data enhancement 134, analyst work unit data prioritization and presentation 450, prioritization inputs 455, and analyst interactions 456.

The anomalies 410 include example anomalies 411, 412, 413, 414, and 415 . . . . The anomalies 410 represent anomalies that can be output from the anomaly detection systems 131A, 131B, 134C introduced in FIG. 1. The anomalies 410 can therefore include different anomalies detected via two or more different telemetry sources. The anomalies 410 can be received as inputs at the multi-stage grouping 420.

The multi-stage grouping 420 can implement multi-stage grouping 133, introduced in FIG. 1, in some embodiments. The multi-stage grouping 420 comprises first stage 430, second stage 440, and adaptive learning 447. The first stage 430 includes example first stage groupings, including threat occurrence group 431, threat occurrence group 432, and threat occurrence group 431 . . . . The threat occurrence group 431 can include, e.g., a group comprising anomaly 411 and anomaly 412, which resulted from grouping/clustering operations performed by the first stage 430. The threat occurrence group 432 can include, e.g., a group comprising anomaly 413, which resulted from grouping/clustering operations performed by the first stage 430. The threat occurrence group 433 can include, e.g., a group comprising anomaly 414 and 415, which resulted from grouping/clustering operations performed by the first stage 430.

The threat occurrence groups 431, 432, 433 . . . can be generated by the first stage 430 based on data associated with the anomalies 410, first stage inputs 435, and/or adaptive learning inputs from adaptive learning 447. The first stage inputs 435 can include, e.g., threat intelligence records from a threat intelligence database. The first stage 430 can be configured to identify, based on the anomalies 410 and the threat intelligence records, which of the anomalies 410 are related by being associated with a common threat occurrence. The first stage 430 can then create a threat occurrence group, e.g., threat occurrence group 431, corresponding to the common threat occurrence, and the first stage 430 can link the related anomalies, e.g., the anomalies 411, 412, to the threat occurrence group 431.

The second stage 440 includes example second stage groupings, including analyst work unit 441, and analyst work unit 442 . . . . The analyst work unit 441 can include, e.g., a group comprising threat occurrence group 431 and threat occurrence group 432, which resulted from grouping/clustering operations performed by the second stage 440. The analyst work unit 442 can include, e.g., a group comprising threat occurrence group 433, which resulted from grouping/clustering operations performed by the second stage 440.

The analyst work unit 441, 442 . . . can be generated by the second stage 440 based on data associated with the threat occurrence groups 431, 432, 433 . . . , the respective anomalies 410 included in the respective threat occurrence groups 431, 432, 433, the second stage inputs 445, and/or adaptive learning inputs from adaptive learning 447. The second stage inputs 445 can include, e.g., an asset inventory comprising asset information for different assets 111, 112, 121, 122 in a network 100. The asset inventory can comprise information such as asset type, asset value, asset geographic location, and/or asset criticality. The second stage 440 can be configured to identify, based on the threat occurrence groups 431, 432, 433 and the asset inventory, which of the threat occurrence groups 431, 432, 433 are related by being associated with a common group of assets. The second stage 440 can then create an analyst work unit, e.g., analyst work unit 441, corresponding to the common group of assets, and the second stage 440 can link the related threat occurrence groups, e.g., the threat occurrence groups 431, 432, to the analyst work unit 441.

The analyst work unit data enhancement 134 is introduced in FIG. 1. In some embodiments, the analyst work unit data enhancement 134 can be configured according to FIG. 5. The analyst work unit data enhancement 134 can be configured to generate analyst summaries of analyst work units such as 441, 442 output from the multi-stage grouping 420. The resulting analyst summaries 451 (for analyst work unit 442), and 452 (for analyst work unit 442) can be supplied to the analyst work unit data prioritization and presentation 450.

Analyst work unit data prioritization and presentation 450 can prioritize and present the analyst summaries 451, 452 output from the analyst work unit data enhancement 134. Alternatively, e.g., in embodiments wherein analyst summaries 451, 452 are not generated, the analyst work unit data prioritization and presentation 450 can prioritize and present the analyst work units such as 441, 442 output from the multi-stage grouping 420. The analyst summaries 451, 452 or the analyst work units 441, 442 can be prioritized according to prioritization inputs 455. The prioritization inputs 455 can include, e.g., asset criticality values of assets affected by any analyst work unit, or confidence values associated with anomalies included in an analyst work unit, or any other data reflecting the level of risk or time urgency associated with an analyst work unit.

The analyst summaries 451, 452 or the analyst work units 441, 442 can be presented to analysts, e.g., via a user interface (UI), and the analyst work unit data prioritization and presentation 450 can be configured to receive analyst interactions 456 via the UI. In some embodiments, analyst work unit data prioritization and presentation 450 can be configured to adaptively learn, from analyst interactions 456, additional prioritization data that can be used to prioritize subsequent analyst summaries 451, 452 or the analyst work units 441, 442. Furthermore, the analyst work unit data prioritization and presentation 450 can be configured to supply analyst interaction data 460 to adaptive learning 447, and the adaptive learning 447 can generate inputs for use by first stage 430 and/or second stage 440 in connection with grouping operations.

Figure 5:
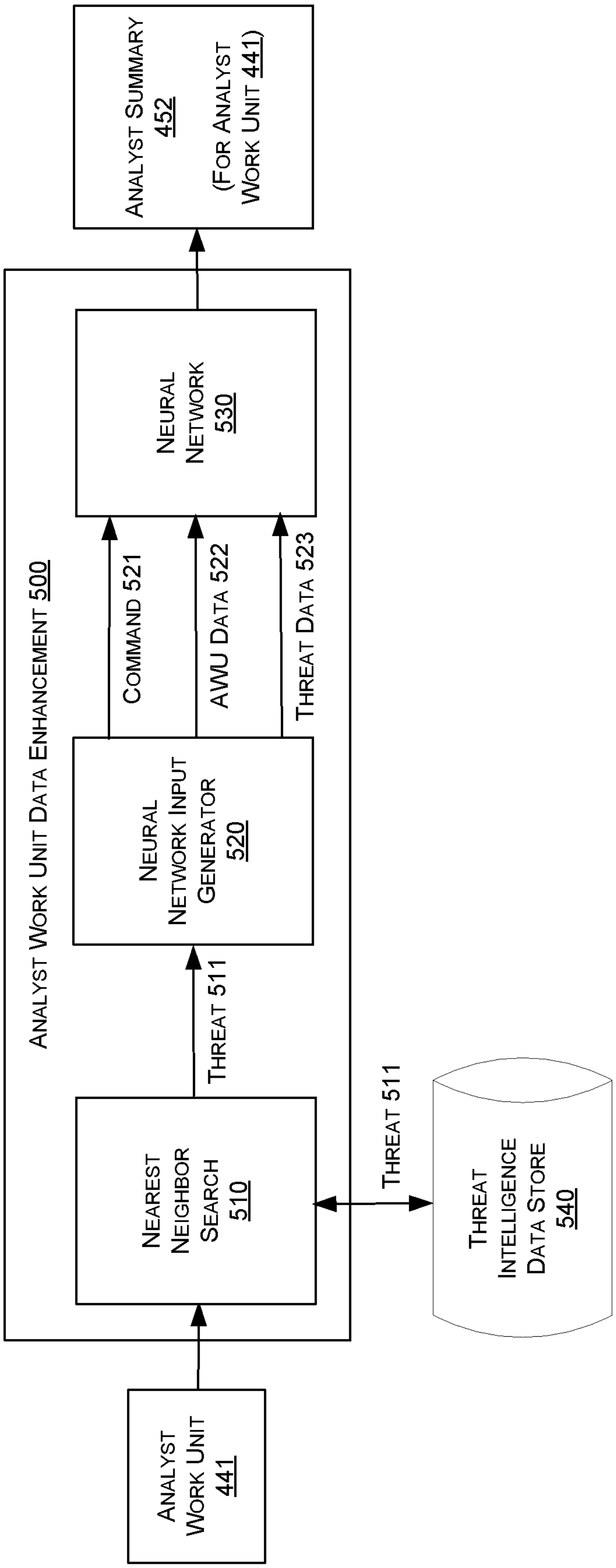
FIG. 5 illustrates example analyst work unit data enhancement, in accordance with various aspects of the technologies disclosed herein.

FIG. 5 illustrates example analyst work unit data enhancement, in accordance with various aspects of the technologies disclosed herein. FIG. 5 includes analyst work unit 441, analyst work unit data enhancement 500, analyst summary 452, and threat intelligence data store 540. The analyst work unit 441 can comprise, e.g., the analyst work unit 441 output from the multi-stage grouping 420 as illustrated in FIG. 4. The example analyst work unit data enhancement 500 illustrated in FIG. 5 can implement the analyst work unit data enhancement 134 introduced in FIG. 1 and FIG. 4. The analyst summary 452 can comprise, e.g., the analyst summary 452 illustrated in FIG. 4. The threat intelligence data store 540 can comprise, e.g., an internal threat intelligence data store coupled to a same LAN as a server comprising the analyst work unit data enhancement 500, or an external threat intelligence data store accessed by the analyst work unit data enhancement 500 via a remote connection to an external network other than the LAN which comprises the threat intelligence data store 540.

The example analyst work unit data enhancement 500 comprises nearest neighbor search 510, neural network input generator 520, and neural network 530. In example operations according to FIG. 5, an analyst work unit 441 output from, e.g., a multi-stage grouping process such as illustrated in FIG. 4 can be processed by analyst work unit data enhancement 500 to thereby generate the analyst summary 452. First, the analyst work unit data enhancement 500 can employ nearest neighbors search 510 to perform a nearest neighbors search in the threat intelligence data store 540. The nearest neighbors search can identify one or more nearest neighbor threats, in the threat intelligence data store 540, that have comparatively higher, or highest similarity to the analyst work unit 441. The result of the nearest neighbors search are labeled as threat 511 in FIG. 5, and also referred to herein as a similar threat 511.

After identifying the similar threat 511, the analyst work unit data enhancement 500 can use the neural network input generator 520 to generate inputs for the neural network 530. For example, the neural network input generator 520 can configure a command 521, analyst work unit data 522, and threat data 523. The command 521 can optionally comprise a natural language command such as, "Here are some data from a security alert. Compose a concise story of what happened, as if it were a security risk report." The analyst work unit data 522 can comprise events or attributes from the input analyst work unit 441, such as:

Event 1 title: Tor

Event 1 text: You are sending traffic to the Tor network

Event 2 title: Disabling security tools

Event 2 data "commandLineArguments": "sudo spctl-master-disable"

The threat data 523 can comprise events or attributes from the similar threat 511, such as a risk level (high, medium, or low) associated with the similar threat.

The neural network 530 can generate the analyst summary 452 in response to the inputs 521, 522, 523 from the neural network input generator 520. Example analyst summaries can include, inter alia, a human readable summary comprising a title, summary, details, and/or recommendations, as provided herein.

In some embodiments, e.g., embodiments that do not implement the multi-stage grouping processes described herein, an input to the analyst work unit data enhancement 500 can comprise an anomaly such as one of the anomalies 410, or a threat occurrence group such as one of the threat occurrence groups 431, 432, 433, in which case the generated analyst summary 452 output by the analyst work unit data enhancement 500 can comprise a summary of the anomaly or threat occurrence group, rather than the analyst summary 452 for the analyst work unit 441.

FIG. 6 illustrates an example computer hardware architecture that can implement a server computer 600, in accordance with various aspects of the technologies disclosed herein. The computer architecture shown in FIG. 6 illustrates a conventional server computer, workstation, desktop computer, laptop, tablet, network appliance, e-reader, smartphone, or other computing device, and can be utilized to execute any of the software components presented herein.

The server computer 600 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the server computer 600.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the server computer 600. The chipset 606 can further provide an interface to a computer-readable storage medium such as a read-only memory ("ROM") 610 or non-volatile RAM ("NVRAM") for storing basic routines that help to startup the server computer 600 and to transfer information between the various components and devices. The ROM 610 or NVRAM can also store other software components necessary for the operation of the server computer 600 in accordance with the configurations described herein.

The server computer 600 can operate in a networked environment using logical connections to remote computing devices and computer systems through a network, such as the LAN 624. The chipset 606 can include functionality for providing network connectivity through a NIC 612, such as a gigabit Ethernet adapter. The NIC 612 is capable of connecting the server computer 600 to other computing devices over the network 624. It should be appreciated that multiple NICs 612 can be present in the server computer 600, connecting the computer to other types of networks and remote computer systems.

The server computer 600 can be connected to a storage device 618 that provides non-volatile storage for the server computer 600. The storage device 618 can store an operating system 620, programs 622, and data, to implement any of the various components described in detail herein. The storage device 618 can be connected to the server computer 600 through a storage controller 614 connected to the chipset 606. The storage device 618 can comprise one or more physical storage units. The storage controller 614 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The server computer 600 can store data on the storage device 618 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 618 is characterized as primary or secondary storage, and the like.

For example, the server computer 600 can store information to the storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The server computer 600 can further read information from the storage device 618 by detecting the physical states or characteristics of one or more particular locations within the physical storage units.

In addition to the mass storage device 618 described above, the server computer 600 can have access to other computer-readable storage media to store and retrieve information, such as program modules, data structures, or other data. It should be appreciated by those skilled in the art that computer-readable storage media is any available media that provides for the non-transitory storage of data and that can be accessed by the server computer 600. In some examples, the operations performed by the computing elements illustrated in FIGS. 1-5, and or any components included therein, may be supported by one or more devices similar to server computer 600.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 618 can store an operating system 620 utilized to control the operation of the server computer 600. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 618 can store other system or application programs and data utilized by the server computer 600.

In one embodiment, the storage device 618 or other computer-readable storage media is encoded with computer-executable instructions which, when loaded into the server computer 600, transform the computer from a general-purpose computing system into a special-purpose computer capable of implementing the embodiments described herein. These computer-executable instructions transform the server computer 600 by specifying how the CPUs 604 transition between states, as described above. According to one embodiment, the server computer 600 has access to computer-readable storage media storing computer-executable instructions which, when executed by the server computer 600, perform the various processes described with regard to FIGS. 7, 8, and 9. The server computer 600 can also include computer-readable storage media having instructions stored thereupon for performing any of the other computer-implemented operations described herein.

The server computer 600 can also include one or more input/output controllers 616 for receiving and processing input from a number of input devices, such as a keyboard, a mouse, a touchpad, a touch screen, an electronic stylus, or other type of input device. Similarly, an input/output controller 616 can provide output to a display, such as a computer monitor, a flat-panel display, a digital projector, a printer, or other type of output device. It will be appreciated that the server computer 600 might not include all of the components shown in FIG. 6, can include other components that are not explicitly shown in FIG. 6, or might utilize an architecture completely different than that shown in FIG. 6.

Figure 8:
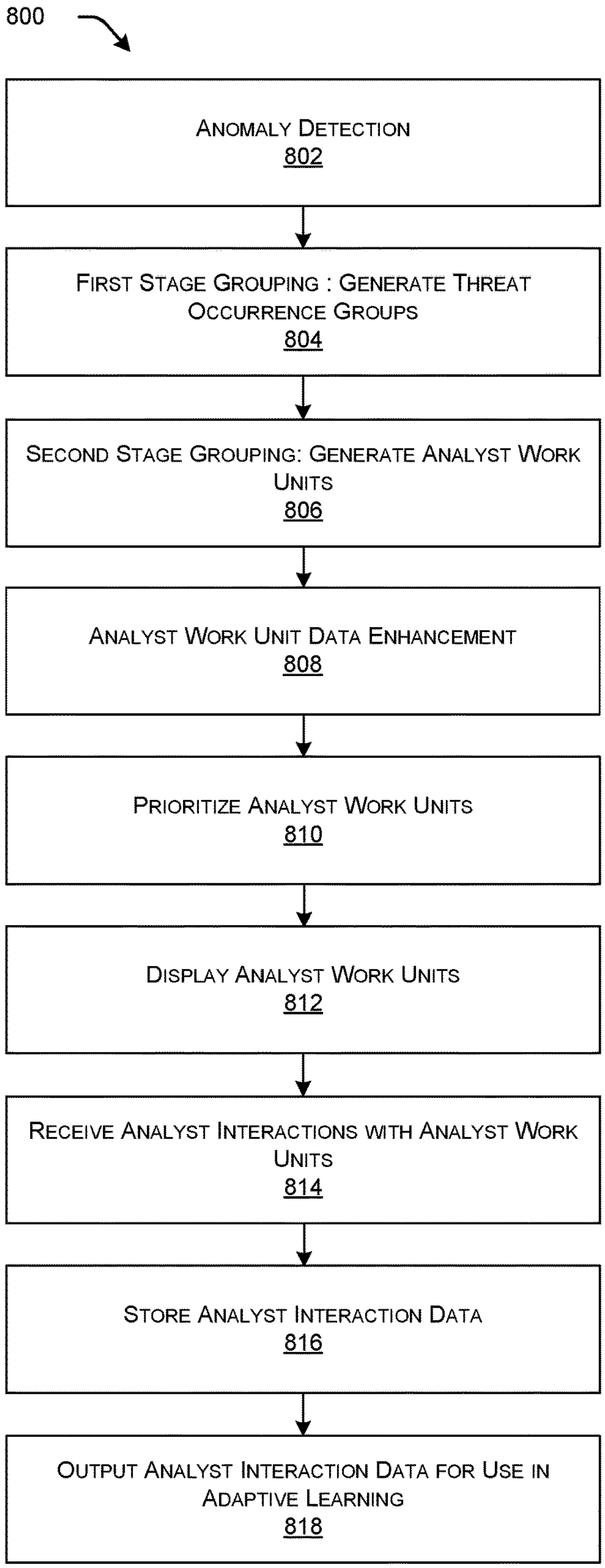
FIG. 8 is a flow diagram that illustrates an example method performed by a computing device in connection with multi-stage grouping to generate analyst work units, analyst work unit data prioritization and presentation, and security team interactions with the analyst work units, in accordance with various aspects of the technologies disclosed herein.
Figure 9:
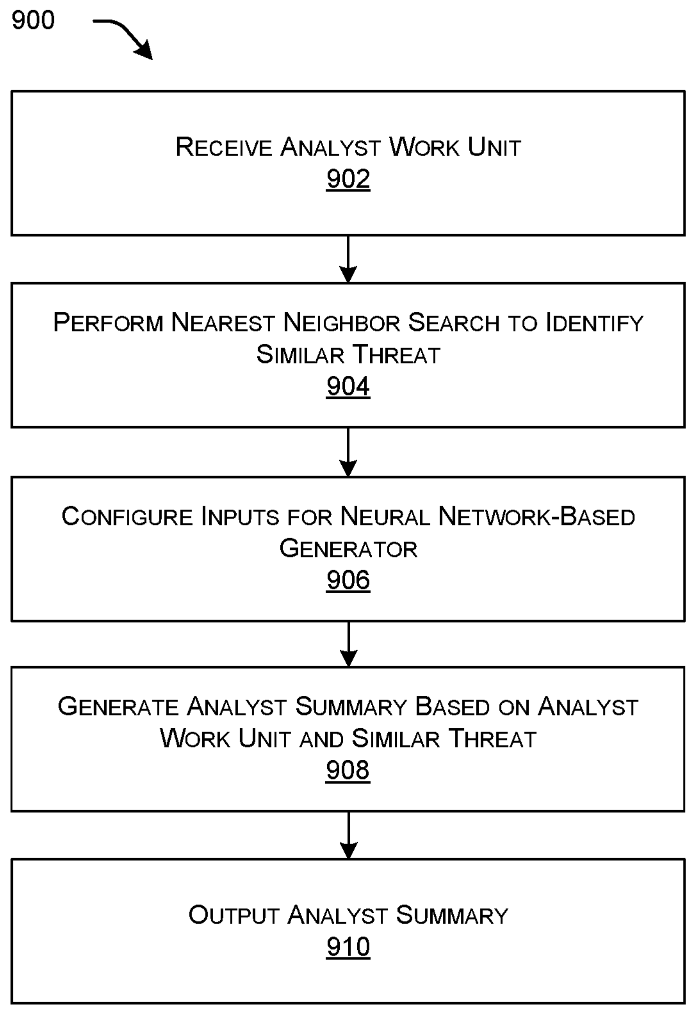
FIG. 9 is a flow diagram that illustrates an example method performed by a computing device in connection with analyst work unit data enhancement, in accordance with various aspects of the technologies disclosed herein.

FIGS. 7, 8, and 9 are flow diagrams of example methods 700, 800, 900 performed at least partly by a computing device, such as the server computer 600. The logical operations described herein with respect to FIGS. 7, 8 and 9 may be implemented (1) as a sequence of computer-implemented acts or program modules running on a computing system and/or (2) as interconnected machine logic circuits or circuit modules within the computing system. In some examples, the methods 700, 800, and 900 may be performed by a system comprising one or more processors and one or more non-transitory computer-readable media storing computer-executable instructions that, when executed by the one or more processors, cause the one or more processors to perform the methods 700, 800, and 900.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIGS. 7, 8, and 9 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 7 is a flow diagram that illustrates an example method performed by a server computer 600 in connection with anomaly data enhancement, in accordance with various aspects of the technologies disclosed herein. At operation 702, the server computer 600 can optionally detect a trigger which initiates the training/template generation stage 704. The detected trigger can comprise, e.g., a occurrence of a new type of anomaly in a network, or changes in an anomaly schema associated with previously detected anomalies.

At 704, the server computer 600 can perform the training/template generation stage 704, which results in generating a template that can be deployed to a production environment, wherein the production environment can use the template to collect attribute representative attributes for an anomaly associated with the template. The training/template generation stage 704 can optionally be repeated multiple times, as described herein.

At 706, the server computer 600 can receive security event information associated with an anomaly. The security event information can comprise, e.g., an identification of an anomaly and at least one attribute associated with the anomaly and detected in a network 100.

At 708, the server computer 600 can identify representative attribute(s) of the anomaly identified at 706. For example, the training/template generation stage 704 can provide the security event information received at 706 as an input to a neural network-based processor, e.g., the neural network 204 illustrated in FIG. 2, along with an instruction for the neural network-based processor to identify representative attribute(s). The neural network-based processor can comprise, e.g., an NLP or a LLM-based processor. The neural network-based processor can be configured to identify at least one representative attribute based on the input. The at least one representative attribute can be determined by the neural network-based processor to represent the anomaly for security analyses of instances of the anomaly.

The at least one representative attribute can include an attribute previously included in the security event information received at 706, or the at least one representative attribute can include a different attribute, other than the attributes previously included in the security event information. In some embodiments, the at least one representative attribute can include multiple representative attributes, optionally including both attributes previously included in the security event information as well as attributes not previously included in the security event information.

At 710, the server computer 600 can generate a template comprising the at least one representative attribute. In some embodiments, the template can be generated directly by the neural network-based processor. In other embodiments, the template can be generated separately, and can include the at least one representative attribute output by the neural network-based processor. An example template is illustrated herein by the representative attribute(s) template 306 in FIG. 3.

At 712, the server computer 600 can perform a consistency check. The consistency check can comprise comparing multiple templates generated via multiple repeated cycles of the training/template generation stage 704, in order to determine consistency of the multiple templates.

The training/template generation stage 704 can optionally be repeated for each of multiple respective first instances the anomaly identified at 706. The receiving at 706, the identifying at 708, and the generating at 710 can be repeated in order to produce multiple templates, and the consistency check at 712 can be repeated, optionally at each cycle, to compare the multiple templates. In some embodiments, at least one of the multiple repetition cycles can be triggered in response to a change in a detection engine, such as an anomaly detection system 131A, configured to detect the anomaly in the network 100, wherein the change in the detection engine results in a change in the at least one attribute associated with the anomaly.

At 714, if the multiple templates pass the consistency check at 712, e.g., if the multiple templates meet a predefined similarity threshold, then the training/template generation stage 704 can be completed and, at 716, a representative consistency-checked template can be deployed to a production environment. Therefore, deploying the template to the production environment can be performed in response to the consistency of the of the multiple templates satisfying a consistency threshold. However, if the multiple templates do not pass the consistency check, then additional repetitions of the training/template generation stage 704 can be performed, using additional instances of the anomaly identified at 706.

At 716, a template output from the training/template generation stage 704 can be deployed to a production environment configured to automatically detect the instances of the anomaly in the network. At 718, production environment can be configured to use the template to define at least one collected attribute that is collected for the security analyses of the instances of the anomaly.

Instances of the anomaly occurring after the template is deployed at 716 may be referred to as second instances of the anomaly, while instances of the anomaly occurring before the template is deployed may be referred to herein as first instances of the anomaly. In some embodiments, the security event information resulting from a second instance of the anomaly can be fed back from the production environment to operation 706, so that second security event information comprising a collected attribute associated with a second instance of the anomaly can be used during further repetitions of the training/template generation stage 704, to increase/enhance consistency of templates generated by the neural network-based processor.

FIG. 8 is a flow diagram that illustrates an example method performed by a server computer 600 in connection with multi-stage grouping to generate analyst work units, analyst work unit data prioritization and presentation, and security team interactions with the analyst work units, in accordance with various aspects of the technologies disclosed herein. At operation 802, the server computer 600 can detect anomalies in a network 100. Alternatively, the server computer 600 can receive anomaly data representing anomalies detected, e.g., at anomaly detections systems 131A, 131B, 131C. The anomalies can therefore include different anomalies detected via multiple different telemetry sources. As shown in FIG. 1, the network 100 can comprise multiple different domains 110, 120 and multiple different computing assets such as 111, 112, 121, and 122. Different anomalies can be detected with different confidence values. Furthermore, different computing assets of the multiple different computing assets 111, 112, 121, and 122 can be associated with different asset criticality values, e.g., as described in connection with FIG. 1.

At 804, the server computer 600 can perform a first stage grouping of a multi-stage grouping process, whereby threat occurrence groups can be generated. For example, the server computer 600 can analyze the anomalies received at 602 based on threat intelligence information, in order to group the anomalies into multiple different threat occurrence groups, wherein each threat occurrence group comprises one or more of the anomalies. Operation 804 can use any desired grouping approach, e.g., any unsupervised clustering or community selection method, including but not limited to a spectral clustering process or a modularity clustering process.

The first stage grouping at 804 can use any of a variety of different variables for grouping. Anomalies occurring in different domains and in different computing assets can potentially be grouped together in a threat occurrence group. For example, at least one first threat occurrence group can comprise two or more different anomalies related to two or more different domains. At least one second threat occurrence group can comprise two or more different anomalies related to two or more different computing assets.

At 806, the server computer 600 can perform a second stage grouping of the multi-stage grouping process, whereby analyst work units can be generated. For example, multiple different threat occurrence groups output from operation 804 can be grouped into multiple different analyst work units, wherein each analyst work unit comprises one or more of the threat occurrence groups. Operation 806 can use any desired grouping approach, e.g., grouping the multiple different threat occurrence groups into multiple different analyst work units at 806 can comprise applying any unsupervised clustering or community selection method including by not limited to spectral clustering processes and modularity clustering processes.

The second stage grouping at 806 can use any of a variety of different variables for grouping. For example, in some embodiments, grouping the multiple different threat occurrence groups into multiple different analyst work units can comprise grouping the multiple different threat occurrence groups according to geographic locations of respective computing assets affected by respective anomalies included in respective analyst work units.

In some embodiments, grouping the multiple different threat occurrence groups into multiple different analyst work units at 806 can comprise grouping the multiple different threat occurrence groups according to threat types associated with respective anomalies included in respective analyst work units.

In some embodiments, grouping the multiple different threat occurrence groups into multiple different analyst work units at 806 can comprise grouping the multiple different threat occurrence groups according to response types associated with respective anomalies included in respective analyst work units.

Operation 808 comprises analyst work unit data enhancement. For example, processes described in connection with FIG. 5 can be performed in order to generate analyst summaries of analyst work units output from operation 806.

Operation 810 comprises prioritizing analyst work units. Analyst work units, and optionally the analyst summaries generated at 808, can be prioritized based on any of the variables disclosed herein. In some embodiments, operation 810 can comprise prioritizing multiple different analyst work units based at least in part on respective asset criticality values of respective computing assets affected by respective anomalies included in respective analyst work units. In some embodiments, operation 810 can comprise prioritizing multiple different analyst work units based at least in part on respective confidence values of respective anomalies included in respective analyst work units.

Operation 812 comprises displaying analyst work units. For example, a prioritized display can be provided, the prioritized display comprising the multiple different analyst work units generated at 804, 806, and 808, and prioritized at 810.

Operation 814 comprises receiving analyst interactions with analyst work units. For example, one or more analyst interactions can be received via the prioritized display provided at 812, and the analyst interactions can result in in analyst interaction data.

Operation 816 comprises storing analyst interaction data, e.g., storing the analyst interaction data received at 814. Operation 818 comprises outputting the analyst interaction data for use in adaptive learning, e.g., for use in adaptive learning applicable to subsequent grouping operations 804, 806 to facilitate grouping subsequent threat occurrence groups into subsequent analyst work units. The analyst interaction data can furthermore be for use in adaptive learning applicable to subsequent prioritizing operations at 810, to facilitate subsequent prioritizing subsequent analyst work units.

FIG. 9 is a flow diagram that illustrates an example method performed by a server computer 600 in connection with analyst work unit data enhancement, in accordance with various aspects of the technologies disclosed herein. At operation 902, the server computer 600 can receive an analyst work unit. The analyst work unit can comprise an output of a second stage of a multistage grouping process. In example embodiments, the analyst work unit can comprise one or more threat occurrence groups, and each of the one or more threat occurrence groups can comprise one or more detected anomalies detected in a network 100 comprising multiple different computing assets.

At operation 904, the server computer 600 can identify, within a data store comprising computing threat information, e.g., within a threat intelligence data store 540 such as illustrated in FIG. 5 which can optionally implement an internal or an external type database, at least one similar threat that has higher similarity to the analyst work unit (received at 902) than one or more other threats identified in the data store. In some embodiments, identifying the similar threat can comprise performing a nearest neighbor search on the data store, to find a threat in the data store that comprises, e.g., a highest similarity to the analyst work unit.

At operation 906, the server computer 600 can configure inputs for a neural network-based generator. For example, the server computer 600 can configure a natural language command, one or more first events based on the analyst work unit, one or more second events based on the at least one similar threat identified at 904, and/or a risk level based on the at least one similar threat identified at 904. These inputs can be provided to the neural network-based generator to initiate operation 908.

At 908, the server computer 600 can generate an analyst summary of the analyst work unit based on the analyst work unit and the at least one similar threat. Generating the analyst summary can comprise using a neural network-based generator to process inputs generated at 906, e.g., natural language command, one or more first events based on the analyst work unit, one or more second events based on the at least one similar threat identified at 904, and/or a risk level based on the at least one similar threat identified at 904. In some embodiments, the neural network-based generator can be configured to use at least one of NLP or a LLM.

When the threat intelligence data store accessed at operation 904 comprises threat response playbook information, generating the analyst summary at 908 can comprise generating, based on the threat response playbook information associated with the similar threat, a next action recommendation associated with the analyst work unit. When the similar threat is associated with a risk level, generating the analyst summary at 908 can comprise providing the risk level to the neural network-based generator so that the network-based generator analyst summary can incorporate the risk level in the analyst summary.

At 910, the server computer 600 can output the analyst summary generated at 908. The analyst summary can comprise, e.g., one or more different sections corresponding to the one or more first events based on the analyst work unit, and other information as described herein.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:

detecting anomalies in a network, the network comprising multiple different domains and multiple different computing assets, wherein different anomalies are detected with different confidence values, and wherein different computing assets of the multiple different computing assets are associated with different asset criticality values;

performing a multi-stage grouping process to generate analyst work units, the multi-stage grouping process comprising:

analyzing the anomalies based on threat intelligence information in order to first group the anomalies into multiple different threat occurrence groups, wherein each threat occurrence group comprises one or more of the anomalies; and after first grouping the anomalies into the multiple different threat occurrence groups, second grouping the multiple different threat occurrence groups into multiple different analyst work units, wherein each analyst work unit comprises one or more of the threat occurrence groups; and prioritizing the multiple different analyst work units based at least in part on:

respective asset criticality values of respective computing assets affected by respective anomalies included in respective analyst work units; and respective confidence values of respective anomalies included in respective analyst work units;

providing a prioritized display of the multiple different analyst work units;

receiving one or more analyst interactions via the prioritized display of the multiple different analyst work units, resulting in analyst interaction data; and storing the analyst interaction data for use in subsequent second grouping operations to facilitate second grouping subsequent threat occurrence groups into subsequent analyst work units.

2. The method of claim 1, wherein second grouping the multiple different threat occurrence groups into multiple different analyst work units comprises second grouping the multiple different threat occurrence groups according to geographic locations of respective computing assets affected by respective anomalies included in respective analyst work units.

3. The method of claim 1, wherein second grouping the multiple different threat occurrence groups into multiple different analyst work units comprises second grouping the multiple different threat occurrence groups according to threat types associated with respective anomalies included in respective analyst work units.

4. The method of claim 1, wherein second grouping the multiple different threat occurrence groups into multiple different analyst work units comprises second grouping the multiple different threat occurrence groups according to response types associated with respective anomalies included in respective analyst work units.

5. The method of claim 1, wherein the analyst interaction data is furthermore for use in subsequent prioritizing operations to facilitate subsequent prioritizing subsequent analyst work units.

6. The method of claim 1, wherein the second grouping the multiple different threat occurrence groups into multiple different analyst work units comprises applying a spectral clustering process or a modularity clustering process.

7. The method of claim 1, wherein the different anomalies are detected via two or more different telemetry sources.

8. A device comprising:

one or more processors;

one or more computer-readable media storing computer-executable instructions that, when executed by the one or more processors, cause the one or more processors to perform operations comprising:

detecting anomalies in a network, the network comprising multiple different domains and multiple different computing assets, wherein different anomalies are detected with different confidence values, and wherein different computing assets of the multiple different computing assets are associated with different asset criticality values;

performing a multi-stage grouping process to generate analyst work units, the multi-stage grouping process comprising:

analyzing the anomalies based on threat intelligence information in order to first group the anomalies into multiple different threat occurrence groups, wherein each threat occurrence group comprises one or more of the anomalies; and after first grouping the anomalies into the multiple different threat occurrence groups, second grouping the multiple different threat occurrence groups into multiple different analyst work units, wherein each analyst work unit comprises one or more of the threat occurrence groups;

prioritizing the multiple different analyst work units based at least in part on:

respective asset criticality values of respective computing assets affected by respective anomalies included in respective analyst work units; and respective confidence values of respective anomalies included in respective analyst work units;

providing a prioritized display of the multiple different analyst work units;

receiving one or more analyst interactions via the prioritized display of the multiple different analyst work units, resulting in analyst interaction data; and storing the analyst interaction data for use in subsequent second grouping operations to facilitate second grouping subsequent threat occurrence groups into subsequent analyst work units.

9. The device of claim 8, wherein second grouping the multiple different threat occurrence groups into multiple different analyst work units comprises second grouping the multiple different threat occurrence groups according to geographic locations of respective computing assets affected by respective anomalies included in respective analyst work units.

10. The device of claim 8, wherein second grouping the multiple different threat occurrence groups into multiple different analyst work units comprises second grouping the multiple different threat occurrence groups according to threat types associated with respective anomalies included in respective analyst work units.

11. The device of claim 8, wherein second grouping the multiple different threat occurrence groups into multiple different analyst work units comprises second grouping the multiple different threat occurrence groups according to response types associated with respective anomalies included in respective analyst work units.

12. The device of claim 8, wherein the analyst interaction data is furthermore for use in subsequent prioritizing operations to facilitate subsequent prioritizing subsequent analyst work units.

13. The device of claim 8, wherein the second grouping the multiple different threat occurrence groups into multiple different analyst work units comprises applying a spectral clustering process or a modularity clustering process.

14. The device of claim 8, wherein the different anomalies are detected via two or more different telemetry sources.

15. A method comprising:

detecting anomalies in a network;

performing a multi-stage grouping process to generate analyst work units, the multi-stage grouping process comprising:

analyzing the anomalies based on threat intelligence information in order to first group the anomalies into multiple different threat occurrence groups;

after first grouping the anomalies into the multiple different threat occurrence groups, second grouping the multiple different threat occurrence groups into multiple different analyst work units;

prioritizing the multiple different analyst work units, resulting in prioritized analyst work units;

receiving one or more analyst interactions with the prioritized analyst work units, resulting in analyst interaction data; and storing the analyst interaction data for use in subsequent second grouping operations to facilitate second grouping subsequent threat occurrence groups into subsequent analyst work units.

16. The method of claim 15, wherein prioritizing the multiple different analyst work units comprising prioritizing the multiple different analyst work units according to respective asset criticality values of respective computing assets affected by respective anomalies included in respective analyst work units.

17. The method of claim 15, wherein prioritizing the multiple different analyst work units comprising prioritizing the multiple different analyst work units according to respective confidence values of respective anomalies included in respective analyst work units.

18. The method of claim 15, wherein second grouping the multiple different threat occurrence groups into multiple different analyst work units comprises second grouping the multiple different threat occurrence groups according one or more of geographic locations, threat types, or response types associated with respective analyst work units.

19. The method of claim 15, wherein the analyst interaction data is furthermore for use in subsequent prioritizing operations to facilitate subsequent prioritizing subsequent analyst work units.

20. The method of claim 15, wherein the second grouping the multiple different threat occurrence groups into multiple different analyst work units comprises applying a spectral clustering process.

21. The method of claim 15, wherein the analyst interaction data comprises analyst changes in groupings output by the multi-stage grouping process, and wherein the analyst changes influence subsequent groupings in the subsequent second grouping operations.

* * * * *